(Model.)
J. G. PERRY, Jr.
MEAT TENDERER.
No. 274,372. Patented Mar. 20, 1883.
Fig: 1.
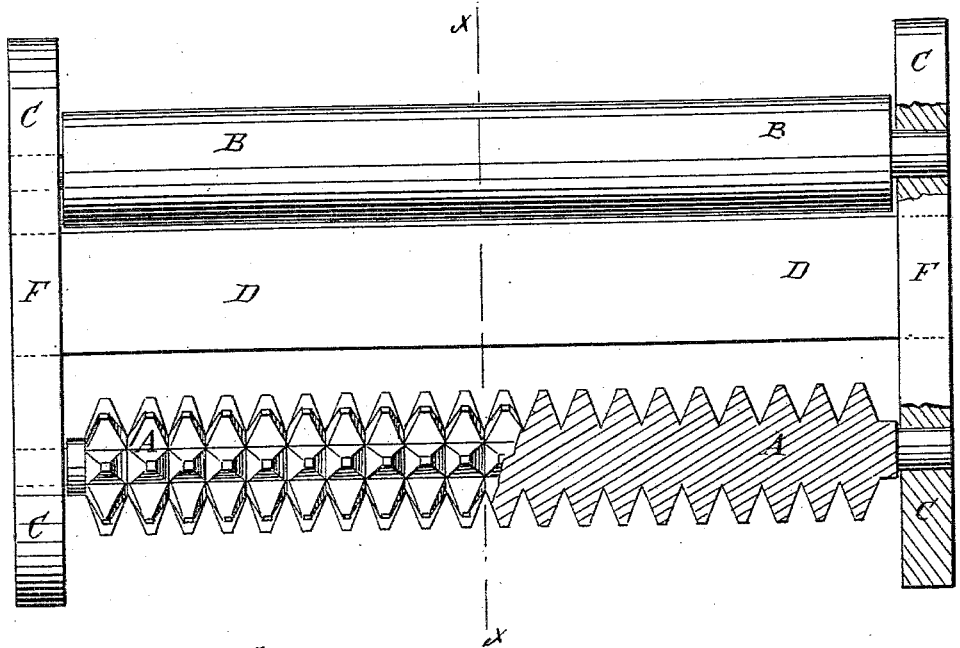
Fig: 2.
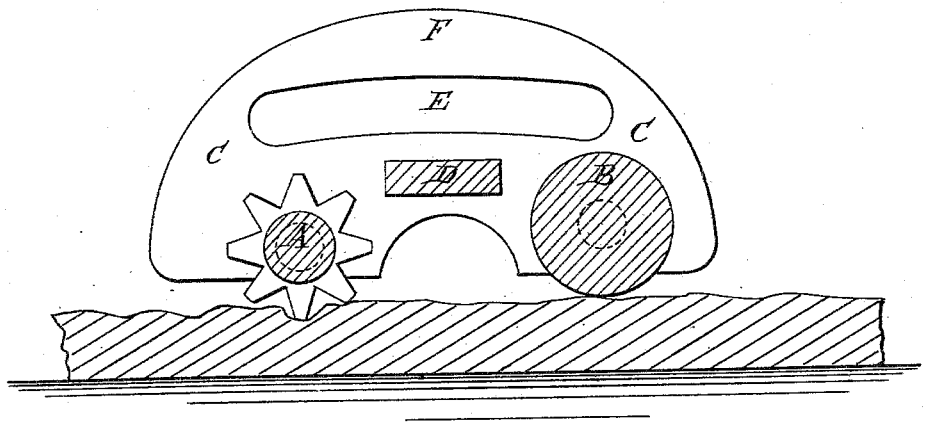
WITNESSES:
Chas. Nider
C. Sedgwick
INVENTOR:
J. G. Perry Jr
BY Munn & Co.
ATTORNEYS.

UNITED STATES PATENT OFFICE.

JOHN G. PERRY, JR., OF NYACK, NEW YORK.

MEAT-TENDERER.

SPECIFICATION forming part of Letters Patent No. 274,372, dated March 20, 1883.

Application filed December 11, 1882. (Model.)

*To all whom it may concern:*

Be it known that I, JOHN G. PERRY, Jr., of Nyack, in the county of Rockland and State of New York, have invented a new and useful Improvement in Meat-Tenderers, of which the following is a full, clear, and exact description.

Reference is to be had to the accompanying drawings, forming a part of this specification, in which similar letters of reference indicate corresponding parts in both the figures.

Figure 1 is a plan view, partly in section, of my improvement. Fig. 2 is a sectional side elevation of the same, taken through the line $x\ x$, Fig. 1.

The object of this invention is to provide a convenient and effective instrument for puncturing the substance and then smoothing the surface of meat cut in slices before boiling or frying the same.

The invention consists in a meat-tenderer constructed with a toothed roller and a smooth roller pivoted to a connecting-frame, whereby the substance of the meat can be punctured to make it tender and its surface smoothed to confine the juices, as will be hereinafter fully described.

A is a roller, which is corrugated longitudinally and then transversely, giving it a toothed surface, as shown in Figs. 1 and 2.

B is a smooth roller, which is placed parallel with the roller A, and the two rollers are journaled to two side pieces, C, which are connected and held in place by a cross-bar, D, attached to or formed with the said side pieces, C. The upper parts of the side pieces, C, have slots E formed in them to form handles F; or the cross-bar D can be so formed as to serve as a handle, or can have a handle formed upon it. The toothed roller A should be journaled to the side pieces, C, in such a position that its teeth will project below the lower edges of the said side pieces, so that the said teeth will enter the meat without being obstructed, and so that the said roller can work close to or readily pass over the bones.

With this improvement the fibers of the meat will be separated, so that the meat will be much more tender when cooked than it would be without such treatment, and at the same time the roller B will smooth the surface of the meat, so that the juices will be cooked in the meat, making the said meat more palatable and nutritious.

Having thus described my invention, I claim as new and desire to secure by Letters Patent—

1. The meat-tenderer consisting essentially of the connected side pieces, C, adapted to be operated by hand, and of the roll A, having teeth adapted to separate the fibers of the meat, but not pierce the latter, and the smooth or plain roll B, following the roll A, as set forth.

2. In a meat-tenderer, the side bars, C, having the hand-slot E, and connected together by the cross-bar D, in combination with the roll A, having teeth with blunt points and angular edges or corners, and the smooth roll B following roll A, substantially as set forth.

JOHN G. PERRY, JR.

Witnesses:
CHAS. HAINES,
SETH B. COLE.